United States Patent
Barillot et al.

(10) Patent No.: US 10,300,849 B2
(45) Date of Patent: May 28, 2019

(54) INTERIOR LIGHTING DEVICE FOR A MOTOR VEHICLE

(71) Applicant: VALEO VISION, Bobigny (FR)

(72) Inventors: Thibaud Barillot, Bobigny (FR); Romain Bel, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/718,771

(22) Filed: Sep. 28, 2017

(65) Prior Publication Data

US 2018/0086260 A1    Mar. 29, 2018

(30) Foreign Application Priority Data

Sep. 28, 2016 (FR) ...................... 16 59197

(51) Int. Cl.
*B60Q 3/80* (2017.01)
*G03B 21/20* (2006.01)
(Continued)

(52) U.S. Cl.
CPC ....... *B60Q 3/80* (2017.02); *B60J 3/04* (2013.01); *B60K 35/00* (2013.01); *B60Q 1/268* (2013.01); *B60Q 3/16* (2017.02); *B60Q 3/208* (2017.02); *B60Q 3/51* (2017.02); *B60Q 3/74* (2017.02); *E06B 9/24* (2013.01); *G02B 27/01* (2013.01); *G03B 21/2093* (2013.01); *B60K 2350/1064* (2013.01); *B60K 2350/203* (2013.01); *B60K 2350/2052* (2013.01); *B60K 2350/2069* (2013.01); *B60K 2350/2091* (2013.01); *B60K 2350/2095* (2013.01); *B60K 2350/922* (2013.01); *B60K 2350/925* (2013.01); *B60K 2350/962* (2013.01); *E06B 2009/2464* (2013.01); *G02F 1/163* (2013.01); *G03B 21/56* (2013.01); *G03B 21/60* (2013.01); *G03B 29/00* (2013.01)

(58) Field of Classification Search
CPC ........ B60K 35/00; B60Q 1/268; G02B 27/01; G03B 21/2093
USPC ...................................... 353/12–14
See application file for complete search history.

(56) References Cited

U.S. PATENT DOCUMENTS 8,757,807 B1 * 6/2014 Disley ............... G03B 29/00
353/13
2013/0120825 A1  5/2013 Lambert et al.
(Continued)

FOREIGN PATENT DOCUMENTS

EP  2 594 987 A2  5/2013
JP  2004-299591  10/2004

OTHER PUBLICATIONS

French Preliminary Search Report dated Aug. 2, 2017 in French Application 16 59197, filed on Sep. 28, 2016 (with English Translation of Categories of Cited Documents).

*Primary Examiner* — William C. Dowling
(74) *Attorney, Agent, or Firm* — Oblon, McClelland, Maier & Neustadt, L.L.P.

(57) ABSTRACT

The invention relates to a device for controlling interior lighting of a motor vehicle interior including at least one light source, a projection support and a control module. The control module is capable of configuring the projection support so that it can receive at least one image emitted by the light source. The invention also relates to a method for lighting at least a part of an interior space of a motor vehicle by such an interior lighting device.

20 Claims, 2 Drawing Sheets

(51) Int. Cl.
  *B60J 3/04*    (2006.01)
  *B60Q 3/51*    (2017.01)
  *E06B 9/24*    (2006.01)
  *B60K 35/00*   (2006.01)
  *B60Q 1/26*    (2006.01)
  *G02B 27/01*   (2006.01)
  *B60Q 3/74*    (2017.01)
  *B60Q 3/208*   (2017.01)
  *B60Q 3/16*    (2017.01)
  *G02F 1/163*   (2006.01)
  *G03B 21/60*   (2014.01)
  *G03B 21/56*   (2006.01)
  *G03B 29/00*   (2006.01)

(56)  References Cited

U.S. PATENT DOCUMENTS

| | | |
|---|---|---|
| 2014/0168608 A1 | 6/2014 | Disley |
| 2015/0094896 A1 | 4/2015 | Cuddihy et al. |
| 2015/0094897 A1* | 4/2015 | Cuddihy ............ B60R 11/0229 701/23 |
| 2015/0261219 A1* | 9/2015 | Cuddihy ............ B60J 1/2016 701/23 |
| 2016/0023665 A1* | 1/2016 | Sherony ............ B60W 50/12 701/2 |

* cited by examiner

INTERIOR LIGHTING DEVICE FOR A MOTOR VEHICLE

TECHNICAL FIELD

The present invention relates to an interior lighting device for a motor vehicle capable of modifying the interior ambiance of the car interior by isolating the occupants of the vehicle from the outside environment and a method for lighting at least a part of the car interior.

STATE OF THE ART

Currently, the interior lighting devices incorporated in the interior of a motor vehicle have restricted functionalities. Generally, the interior lighting is limited to dome lights that can serve as reading lights and whose activation can be automatic or manual, as well as other light sources that can be activated to create a low-intensity ambient lighting. This ambient lighting makes it possible, for example, to highlight details inside of the vehicle.

The development of communicating vehicles with autonomous or semi-autonomous driving favors the incorporation of new functions in order to convert the car interior into a user-friendly and comfortable space while maintaining a high level of safety. This trend entails in particular allocating significant importance to information and multimedia in the heart of the vehicles. Some vehicles are thus equipped with screens which allow not only guidance but also the viewing of photos or of videos without thereby giving the possibility for the occupants of the vehicle to be isolated from the outside environment. In the integrated solutions, a multimedia station can be installed at the front the vehicle and control screens embedded in the dashboard, in the back of the headrest of each front seat or even in the ceiling. In the mobile solutions, the roaming multimedia devices of laptop PC, smartphone, tablet, DVD player type, are installed and connected in the car interior by the occupants of the vehicle.

The aim of the invention is to remedy the abovementioned drawbacks by improving the driving and control of the interior lighting of the interior of a motor vehicle by virtue of a device capable of modifying certain surfaces of the car interior in order to project thereon images and/or videos and create a soothing "cocoon" ambiance by occulting and modifying the outside view from inside the car interior.

The device according to the invention ensures the reliability of the control and improves, through its ergonomics, the comfort of the occupants of the vehicle while guaranteeing their safety.

SUMMARY OF THE INVENTION

The subject of the invention is an interior lighting device for a motor vehicle comprising:
  at least one light source capable of emitting at least one light beam;
  at least one projection support;
  a control module arranged to configure the light source, the module being also arranged to configure the at least one projection support in a passive mode or in an active mode in which the light beam forms at least one image, dynamic and/or static, on said projection support and according to the manual or automatic driving mode of the motor vehicle.

A motor vehicle should be understood here to mean both manual-drive vehicles and automatic-drive autonomous vehicles or even semi-autonomous vehicles for which the driving can switch from a manual mode to an automatic mode. It is understood that, based on the vehicle driving mode and for safety reasons, the choice of the projection supports can vary. Thus, in an autonomous or semi-autonomous vehicle in which the driving operates in automatic mode, each glazed surface of the vehicle and/or the windshield and/or one of the front and/or rear side windows and/or the sunroof and/or the rear window can serve as projection support. In this configuration, the light source is preferably installed at the front of the car interior, for example in the front ceiling directly above the dashboard and/or in the front centre console.

The device of the invention makes it possible to control at least one light source, fixedly or movably mounted in the car interior. A light source should be understood to mean at least one means for emitting light rays to form a light beam projected onto the projection support of the invention. Such a means can be a simple light source such as a light strip, a spot light source configured to emit a weakly divergent light beam, such as a reading light for example, and in particular of the light-emitting diode type, or else a source and an associated projector device or even a source and a reflector making it possible to deflect the rays. In the case where the light source consists of one or more light-emitting diodes (LEDs), the light intensity and/or the color of the diodes can vary according to the atmosphere sought.

According to an advantageous and preferred feature of the invention, the light source is a device for projecting light and/or static or dynamic images and/or videos, preferably a video projector, and even more preferably a pico-projector. According to an embodiment of the invention, the light source can be installed in the front and/or rear ceiling of the vehicle and/or in the center console. The latter can, among other functions, serve as armrest for the driver and for the front passenger, and/or in at least one rear console, fixed or retractable, situated between the rear seats and being able to serve as armrest. Since the aim of the invention is to modify the outside view of at least one occupant of the vehicle and to create, in the car interior, agreeable light ambiences, it is possible to envisage projecting static images such as landscapes and/or dynamic images such as photo slide shows, videos or even images of "equalizer" type linked with the music broadcast in the car interior.

According to an advantageous feature of the invention, the projection support is a surface, preferably smooth, free of information and of structural elements, and arranged to receive at least one image, static or dynamic, projected by a light source. Said projection support or surface is advantageously a glazed surface of the vehicle such as a windshield and/or at least one front and/or rear side window and/or a sunroof and/or a rear window. Said glazed surface is arranged to switch reversibly and on demand from an OFF passive mode, preferably corresponding to a transparent state of the glazed surface, to an ON active mode, preferably corresponding to an at least partially opaque state of said glazed surface, defined for example by a transmission coefficient less than or equal to 25% in the visible spectrum. More preferably, the ON active mode corresponds to an opaque state of the glazed surface. To achieve this transition from an OFF mode to an ON mode, the glazed surface forming the projection support preferably comprises an electrochromic structure.

The electrochromic technology makes it possible, under the effect of an applied electrical field, to vary the optical properties of said support, in particular its light transmission. Through this technology, the light transmission of the glazed surface forming the projection support according to the invention decreases to become an opaque surface, capable of receiving at least one dynamic and/or static projected image.

The electrochromic structures are composite structures comprising a plurality of functional layers. Said layers consist of at least one support or substrate, preferably at least one transparent glazed surface or sheet of glass and an electrochromic system which consists of two electrode layers where electrochemical reactions take place, one of the electrodes necessarily having to be transparent, a charge-conducting or electrolyte element capable of allowing the passage of an electrical current by ion displacement, and an organic and/or inorganic electrochromic material. The optical properties of the duly formed electrochromic structure can vary, in particular the light transmission, in response to the application of an electrical field which generates a reversible oxydoreduction reaction within the electrochromic material.

For the projection support in ON active mode to be able to be like a projection screen and guarantee a sufficient image quality, a light-colored, preferably white, opaque state will be preferred.

The electrochromic technology associated with glazed surfaces is commonly used in building and the motor vehicle industry. Liquid-crystal shuttering windows, capable of switching from an opaque translucent state to a transparent state, have an application in building as glass partitions or in cars as interior walls. This state change is reversible as a function of the electrical potential applied between the terminals of the electrochromic screen and according to a relatively short response time. Darkening electrochromic windows have an application in vehicle sunroofs and ensure solar protection. They are capable of reversibly changing color under the effect of an electrical voltage from a transparent state to a dark colored state. The electrochromic rear-view mirrors that have an antiglare function operate on a similar principle and have the capacity to be able to darken rapidly in case of dazzling of the driver provoked by the headlights of other users driving behind him or her.

To confer electrochromic properties on the projection support according to the invention, several solutions can be envisaged. The glass forming the glazed surface of the projection support has a composite structure. Preferably a composite glass comprises an electrochromic system or else can be covered with an electrochromic film, possibly adhesive, said adhesive film then transforming the existing glazed surface into a smart glazed surface, of projection screen type.

Each glazed surface of the motor vehicle, the windshield and/or at least one front and/or rear side window and/or the sunroof and/or the rear window can serve as projection support according to the invention. However, the choice of the projection supports varies according to the embodiment of the invention, and more particularly depends on the type of manual or automatic driving of the vehicle and possibly on the safety conditions.

In a conventional or semi-autonomous vehicle in which the driving operates in manual mode, the projection zones are reduced in order not to hamper the vision of the driver on the road scene or divert his or her attention from it. In this embodiment, the projection supports are limited to the sunroof and to the rear side windows, preferably to the rear side window situated immediately behind the driver. In this configuration, the light source is preferably installed at the rear of the car interior in the rear ceiling and/or in the armrest of the rear center console.

It is possible to configure the front and/or rear zones of the car interior, and/or the projection supports and/or the light sources independently and autonomously. It will be possible to have, for example, a first image projected onto a front side window and a second image, distinct from the first, projected onto a rear side window of said car interior. It will be noted that any other image projection combination, for example the first on a side window and the second on the sunroof, can be envisaged.

The control module according to the invention is arranged, on the one hand, to activate and configure the light source and, on the other hand, to configure the projection support in an OFF passive mode or in an ON active mode, so that said projection support can receive at least one dynamic and/or static image formed by the light beam from at least one light source of the car interior. The control module, connected to at least one light source and one projection support, comprises at least a processor and/or a memory and/or a data storage means and/or a means for reading static and/or dynamic image files. The data storage means of the control module comprises a database of static and/or dynamic images prestored or transferred by the users using a removable multimedia device connected to the control module or according any wired or wireless communication means, such as Bluetooth or WiFi for example.

A removable multimedia device should be understood to mean a digital data storage SD memory card or an external peripheral device of USB key, smartphone, camera, laptop PC, tablet, DVD player type. The control module installed, preferably, at the front of the vehicle, is capable of reading files of images to be projected and of transmitting light source and projection support activation instructions. The control module can comprise at least one control button installed at the rear of the car interior, for example in at least one rear console, such that the rear passengers of the vehicle can autonomously and independently actuate the light sources and projection supports. According to an advantageous feature of the invention, it is possible to associate with the device of the invention, preferably with the control module, at least one temperature and/or light intensity sensor, in order to detect the conditions outside the vehicle. In response to the data collected by said sensors, the control module can select and project images capable of enhancing the ambience of the car interior and the wellbeing of the occupants. As an example, provision can be made to project sunlit landscape images if the temperature and/or light intensity data detected by the sensor are below a certain threshold.

The invention relates also to a method for lighting at least a part of an interior space of a motor vehicle by the lighting device according to the invention, which makes it possible to occult and modify the view outside from inside the car interior in order to create a soothing specific ambience within the vehicle. Said lighting method comprises at least:

a step of activation of the control module, said activation being able to be performed manually by at least one occupant of the vehicle, or automatically when the vehicle, autonomous or semi-autonomous, is in automatic driving mode or even following the detection and the collection of particular temperature and/or brightness conditions outside said vehicle by at least one temperature and/or light intensity sensor. The data collected by said sensors can be subjected to an analysis step by the control module, a step of selection and of configuration of at least one electrochromic glazed surface forming a projection support of the vehicle by attenuation of the light transmission of said glazed surface, so that said glazed surface switches from an OFF passive mode, corresponding to a transparent state, to an ON active mode, corresponding to an opaque, preferably white, state. The duly configured projection support can then be likened to a projection screen, preferably white, a step of configuration of at least one light source of the car interior to direct at least one light beam from said source onto the configured projection support, a step of selection and of reading of image files prestored in the storage means of the control module or transferred by at least one occupant of the vehicle using a removable multimedia device previously connected to said control module.

DESCRIPTION OF THE FIGURES

Other features and advantages of the invention will become more clearly apparent on reading the detailed description of an embodiment of the invention, given hereinbelow as an illustrative and nonlimiting example and based on the attached figures, in which the interior lighting device according to the invention has been illustrated incorporated in the interior of a motor vehicle.

DETAILED DESCRIPTION OF THE INVENTION

It is necessary to note that while the figures explain the invention in detail for its implementation, they can also serve to better define the invention as appropriate. It will also be understood that the embodiment of the invention illustrated by the figures is given as a nonlimiting example. Consequently, other configurations of the device according to the invention can be produced, particularly by variations of the arrangement, of the distribution and of dimensioning of the light sources, of the projection supports and of the control module that make up the lighting device according to the invention.

Figure 1A:
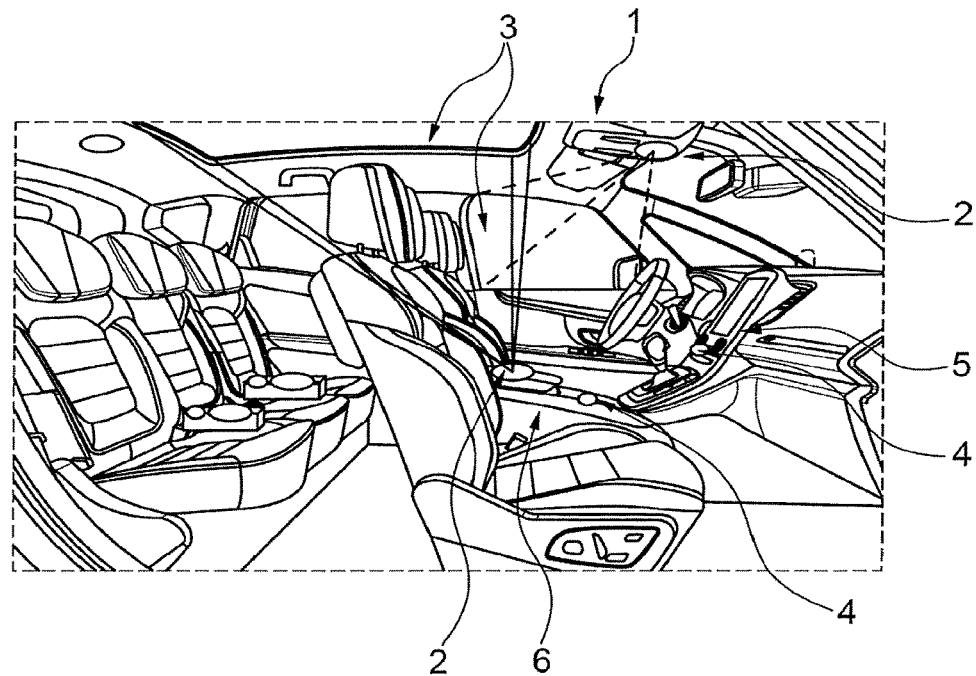
FIGS. 1a and 1b are profile and perspective views of the car interior, in which there are incorporated, at the front of the vehicle, light sources capable of projecting at least one image onto projection supports which have been respectively configured in OFF inactive mode and in ON active mode by the control module.
Figure 1B:
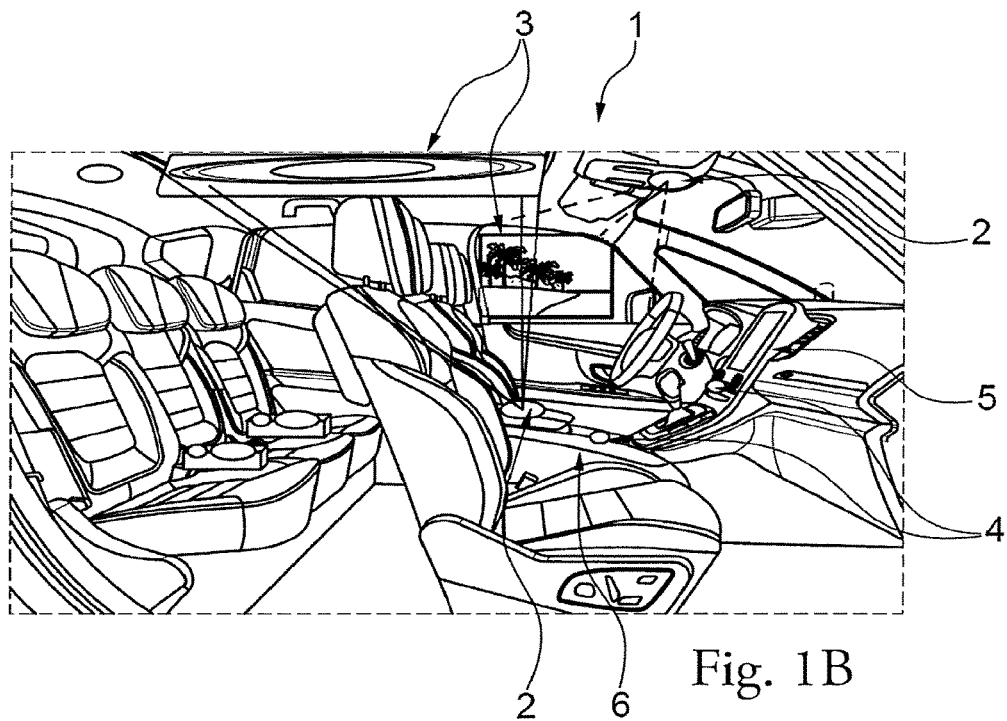

FIGS. 1a and 1b illustrate the arrangement and the operation of the interior lighting device 1 according to the invention in the front zone of the car interior. FIG. 1a illustrates the interior lighting device 1 when the latter is in OFF passive mode whereas FIG. 1b illustrates the interior lighting device 1 after switching to ON active mode. In this embodiment, the interior lighting device 1 of the invention comprises two light sources 2, projection supports 3, and a control module. A first light source 2 is installed in the front ceiling, directly above the dashboard, and a second in the center console 6. Said light sources 2 target the projection supports 3, whose representations are here, for reasons of clarity, limited to the front side glazed surface on the driver's side and to the sunroof. The control module, incorporated here in the dashboard 5, comprises an additional control button 4 located in the center console 6, so that the driver and/or the front passenger can activate the lighting device 1 while leaving their forearm in rest position on the armrest.

The light sources 2 are, preferably, pico-projectors making it possible to project static and/or dynamic images onto the projection supports 3 when the latter have switched over from an OFF passive mode (FIG. 1a) to an ON active mode (FIG. 1b). This switching, from a passive transparent state to an active opaque state, is made possible after activation of the electrochromic glazed surfaces forming the projection supports 3 by application of an electrical voltage by the control module. The opacified surface of the projection support is then like a white projection screen and guarantees the quality of the projected image. The projected images have the effect of isolating the occupants of the vehicle from the outside environment and favor the creation of a soothing ambience within the car interior. It is possible to autonomously and independently project distinct images onto each of the projection supports activated. For obvious reasons of safety, the projection supports 3 situated at the front of the car interior, in particular the front side windows and/or the windshield, are activated only when the driving of the vehicle is in automatic mode.

Figure 2A:
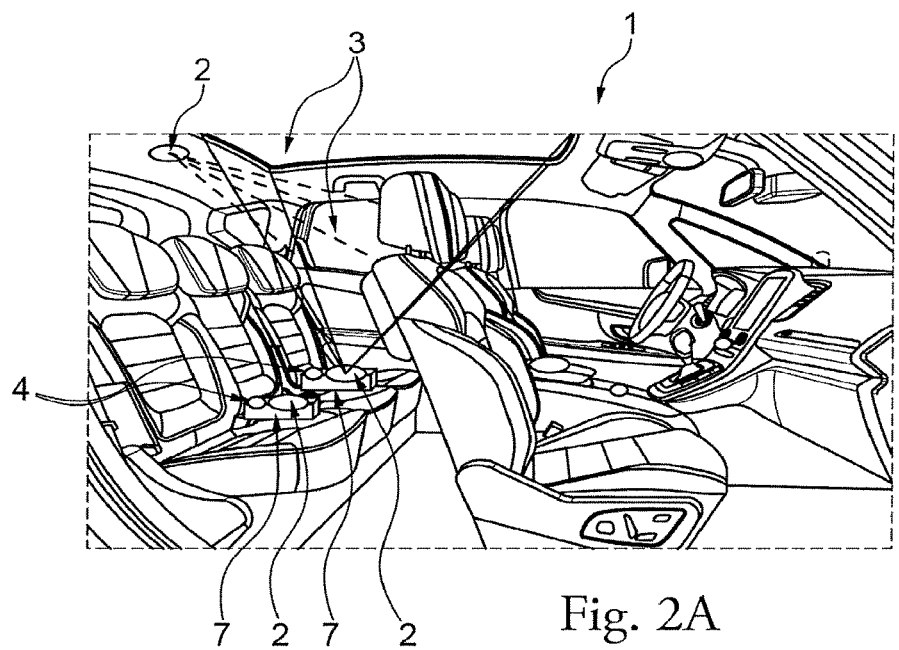
FIGS. 2a and 2b are profile and perspective views of the car interior, in which there are incorporated, at the rear of the vehicle, light sources capable of projecting at least one image onto projection supports which have been respectively configured in OFF inactive mode and in ON active mode by the control module.
Figure 2B:
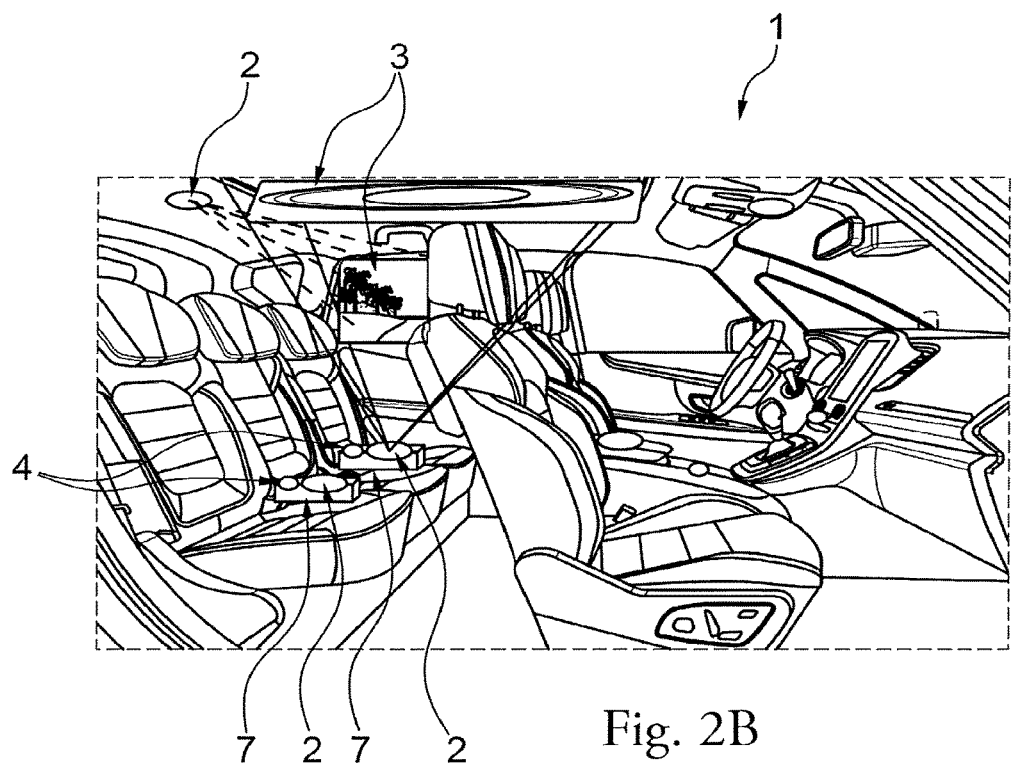

FIGS. 2a and 2b illustrate the arrangement and the operation of the interior lighting device 1 according to the invention in the rear zone of the car interior. FIG. 2a illustrates the interior lighting device 1 when the latter is in OFF passive mode whereas FIG. 1b illustrates the interior lighting device 1 after switching over to ON active mode. In this embodiment, the interior lighting device 1 of the invention comprises at least two light sources 2, projection supports 3, a control module. A first light source 2 is installed in the rear ceiling and at least one second light source is installed in at least one rear console 7 depending on the number of passenger seats. Said light sources target the projection supports 3, whose representations are here, for reasons of clarity, limited to the rear side glazed surface on the driver's side and to the sunroof. The control module is activated via at least one control button 4 located in at least one rear console 7, so that each rear passenger can activate the light device 1 autonomously and independently.

As previously described, the light sources 2 are, preferably, pico-projectors making it possible to project static and/or dynamic images onto the projection supports 3 when the latter have switched over from an OFF passive mode (FIG. 2a) to an ON active mode (FIG. 2b). This switchover, from a passive transparent state to an active opaque state, is made possible after activation of the electrochromic glazed surfaces that form the projection supports 3 by application of an electrical voltage by the control module. The projection support surface made opaque is then like a white projection screen and guarantees the quality of the projected image. The projected images have the effect of isolating the occupants of the vehicle from the outside environment and favor the creation of a soothing ambience within the car interior. It is possible to autonomously and independently project distinct images onto each of the projection supports activated. This second embodiment is applicable whatever the automatic or manual driving mode of the vehicle and potentially on any glazed surface situated at the rear of the car interior. In manual driving, it is however recommended, for safety reasons, to limit the projection of images onto the side glazed surface situated immediately behind the driver and/or onto the sunroof.

Whatever the embodiment of the invention, it will be understood that the interior lighting device 1 can generate the projection of static and/or dynamic images onto the electrochromic glazed surfaces of the vehicle, said surfaces forming projection supports after having been made opaque by configuration in ON active mode. It will also be understood that the interior lighting device 1 can generate various light ambiences within the car interior, in response to the activations of said device by the driver and/or the front and/or rear passengers of the vehicle. It is understood that any front passenger, in particular the driver, can activate all the light sources 2 and the projection supports 3 from the control module installed in the dashboard and/or in the center console and control the projection of identical and/or distinct static and/or dynamic images onto each of said projection supports. Similarly, the rear passengers can activate the rear light sources and projection supports of their choice using control buttons located in at least one rear console 7 and do so autonomously and independently of the actions generated by the front occupants of the vehicle.

Many and various light ambience combinations can be created within the car interior, by projection of static images, for example of landscapes, and/or dynamic images, for example a slide show of photos and/or a video or even images of the "equalizer" type linked with the music broadcast in the car interior.

The control module, configured to configure the projection supports and the light sources, also comprises storage means and/or image file reading means, said images being able to be prestored or transferred by the users using at least one removable multimedia device connected for this purpose to the control module. Removable multimedia devices should be understood to be a digital data storage SD memory card or a USB key, smartphone, camera, laptop PC, tablet, DVD player, etc.

Furthermore, it is possible to associate with the control module temperature and/or light intensity sensors, capable of detecting the conditions outside the vehicle. In response to the data collected by said sensors, the control module can select and project images capable of enhancing the ambience of the car interior. As an illustrative example, provision can be made to project an image representing a beach when the temperature sensor detects a low outside temperature and/or an image of a sunlit landscape when the light intensity sensor detects an outside darkening linked to the time of day, the season or even when passing through a tunnel.

According to the main and preferred embodiment of the invention, the method for lighting at least a part of the interior of a motor vehicle by virtue of which the outside view from inside the car interior is occulted and modified in order to create a soothing specific ambience within the vehicle comprises at least:
  a step of activation of the control module, said activation being able to be performed manually by at least one occupant of the vehicle, or automatically upon switching the vehicle to automatic driving mode or even following the detection, by temperature and/or light intensity sensors, of particular temperature and/or brightness conditions outside said vehicle,
  a step of selection and of configuration of at least one electrochromic glazed surface of the vehicle or projection support 3 so as to vary the light transmission of said glazed surface, preferably to attenuate it in order for the glazed surface to switch over from an OFF passive mode, corresponding to a transparent state, to an ON active mode, corresponding to an opaque state. The duly configured projection support 3 is like a projection screen, preferably white,
  a step of configuration of at least one light source 2 to direct at least one light beam from said source onto the configured projection support 3,
  a step of selection and of reading of image files prestored in the storage means of the control module or transferred by at least one occupant of the vehicle using a removable multimedia device previously connected to said control module.

The above description clearly explains how the invention can achieve the objectives set for it by proposing a simply and reliably controlled ergonomic interior lighting device, capable of enhancing the wellbeing of vehicle occupants.

The present invention is not limited to the embodiment given by way ofnonlimiting example.

The invention claimed is:

1. An interior lighting device for a motor vehicle, the interior lighting device comprising:
  at least one light source configured to emit at least one light beam;
  at least one projection support;
  a sensor configured to detect a condition outside the motor vehicle; and
  processing circuitry configured to control the light source, control the at least one projection support to be in a passive mode or in an active mode in which the light beam forms an image on said projection support, according to a manual or automatic driving mode of the motor vehicle, and
  project the image based on the detected condition outside the motor vehicle.

2. The interior lighting device according to claim 1, wherein the light source is a device for projecting light and/or static or dynamic images and/or videos.

3. The interior lighting device according to claim 2, wherein the light source is a pico-projector.

4. The interior lighting device according to claim 1, wherein the light source is installed in a front and/or a rear ceiling of the motor vehicle and/or in a center console and/or in at least one rear console.

5. The interior lighting device according to claim 1, wherein the projection support is a glazed surface of the motor vehicle arranged to switch reversibly from a transparent state to an opaque state.

6. The interior lighting device according to claim 5, wherein the glazed surface is a windshield and/or at least one front and/or rear side window and/or a sunroof and/or a rear window.

7. The interior lighting device according to claim 5, wherein the glazed surface comprises an electrochromic glass.

8. The interior lighting device according to claim 7, wherein the electrochromic glass has a composite structure.

9. The interior lighting device according to claim 7, wherein the electrochromic glass is covered with an electrochromic film.

10. The interior lighting device according to claim 1, wherein front and/or rear zones of the motor vehicle interior and/or the projection supports and/or the light sources are configured independently and autonomously.

11. The interior lighting device according to claim 1, further comprising:
  a memory configured to store static and/or dynamic image file, wherein
  the processing circuitry is further configured to read the static and/or dynamic image files from the memory.

12. The interior lighting device according to claim 11, further comprising a database of images prestored or transferred using a removable multimedia device.

13. The interior lighting device according to claim 12, wherein the removable multimedia device is a digital data storage SD memory card or a USB key or a smartphone or a camera or a laptop PC or a tablet or a DVD player.

14. The interior lighting device according to claim 1, further comprising at least one control button installed at a rear of the motor vehicle interior.

15. The interior lighting device according to claim 1, wherein the sensor is a temperature sensor or a light intensity sensor.

16. A method for lighting at least a part of an interior space of a motor vehicle by an interior lighting device, said method comprising at least:
- detecting, by a sensor, a condition outside the motor vehicle;
- configuring at least one projection support of the motor vehicle by attenuation of light transmission;
- configuring at least one light source of the interior space of the motor vehicle to direct a light beam from said at least one light source onto the configured projection support; and
- projecting an image based on the detected condition outside the motor vehicle.

17. The method according to claim 16, further comprising analyzing the data detected by the sensor, the sensor being a temperature sensor or a light intensity sensor.

18. The method according to claim 16, further comprising selecting and reading image files prestored in a memory or transferred by at least one occupant of the motor vehicle using a removable multimedia device.

19. The interior lighting device according to claim 2, wherein the light source is installed in a front and/or a rear ceiling of the motor vehicle and/or in a center console and/or in at least one rear console.

20. The interior lighting device according to claim 2, wherein the projection support is a glazed surface of the motor vehicle arranged to switch reversibly from a transparent state to an opaque state.

* * * * *